US008185670B2

(12) United States Patent
Song (10) Patent No.: US 8,185,670 B2
(45) Date of Patent: May 22, 2012

(54) AUDIO/VISUAL (AV) DEVICE CONTROL METHOD USING PERSONAL INFORMATION AND AV DEVICE USING THE SAME

(75) Inventor: Kyung-soon Song, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 219 days.

(21) Appl. No.: 12/013,654

(22) Filed: Jan. 14, 2008

(65) Prior Publication Data

US 2009/0024766 A1 Jan. 22, 2009

(30) Foreign Application Priority Data

Jul. 16, 2007 (KR) ........................ 10-2007-0071368

(51) Int. Cl.
*G06F 3/00* (2006.01)
(52) U.S. Cl. .......................................................... 710/8
(58) Field of Classification Search ...................... 710/8
See application file for complete search history.

(56) References Cited

U.S. PATENT DOCUMENTS

| 6,356,956 | B1 * | 3/2002 | Deo et al. ........................ 719/318 |
| 7,280,041 | B2 * | 10/2007 | Ryou ........................ 340/539.12 |
| 7,458,080 | B2 * | 11/2008 | Parker et al. .................. 719/318 |
| 7,490,775 | B2 * | 2/2009 | Biderman ................. 235/472.01 |
| 7,542,816 | B2 * | 6/2009 | Rosenberg ....................... 700/94 |
| 2001/0051928 | A1 * | 12/2001 | Brody ............................. 705/52 |
| 2002/0144259 | A1 * | 10/2002 | Gutta et al. ...................... 725/10 |
| 2007/0027917 | A1 * | 2/2007 | Ariel et al. .................. 707/104.1 |
| 2008/0320189 | A1 * | 12/2008 | Arssov ........................... 710/105 |
| 2009/0006722 | A1 * | 1/2009 | McAvoy et al. ............... 711/103 |

FOREIGN PATENT DOCUMENTS

KR 2003-73824 9/2003

OTHER PUBLICATIONS

Seungwon Na; Seman Oh; , "Design and implementation of sync engine for automatic installation system of PDA application programs," Computational Intelligence in Robotics and Automation, 2003. Proceedings. 2003 IEEE International Symposium on , vol. 1, No., pp. 372-377 vol. 1, Jul. 16-20, 2003.*
Agarwal, S.; Starobinski, D.; Trachtenberg, A.; , "On the scalability of data synchronization protocols for PDAs and mobile devices," Network, IEEE , vol. 16, No. 4, pp. 22-28, Jul./Aug. 2002.*
Yuvraj Agarwal, Ranveer Chandra, Alec Wolman, Paramvir Bahl, Kevin Chin, and Rajesh Gupta. 2007. Wireless wakeups revisited: energy management for voip over wi-fi smartphones. In Proceedings of the 5th international conference on Mobile systems, applications and services (MobiSys '07). ACM, New York, NY, USA, 179-191.*

* cited by examiner

*Primary Examiner* — Tariq Hafiz
*Assistant Examiner* — Dayton Lewis-Taylor
(74) *Attorney, Agent, or Firm* — Stanzione & Kim, LLP (57) ABSTRACT

An AV device control method and an AV device using the same. After receiving personal information gathered by an external device, an AV device is automatically controlled according to a user's personal information. Accordingly, the AV device can be customized to operate for an individual user.

23 Claims, 5 Drawing Sheets

| Day | Activity type | Start time | End time | Note |
|---|---|---|---|---|
| Monday | Rising | 06:00 | - | |
| | Transfer | 08:00 | 09:00 | Subway |
| | Lecture | 10:00 | 12:00 | Lecture at the institute |
| | Listen to radio | 13:00 | 14:00 | EBS educational broadcasting |
| | Transfer | 17:00 | 18:00 | Bus |
| Tuesday | | | | |

⋮

| | | | | |
|---|---|---|---|---|
| Sunday | Rising | 10:00 | - | |
| | View TV | 11:00 | 13:00 | MBC |
| | Exercise | 14:00 | 15:00 | Jogging |

FIG. 5

AUDIO/VISUAL (AV) DEVICE CONTROL METHOD USING PERSONAL INFORMATION AND AV DEVICE USING THE SAME

CROSS-REFERENCE TO RELATED APPLICATIONS

This application claims the benefit under 35 U.S.C. §119 (a) from Korean Patent Application No. 10-2007-71368 filed on Jul. 16, 2007 in the Korean Intellectual Property Office, the entire disclosure of which is incorporated herein by reference.

BACKGROUND OF THE INVENTION

1. Field of the Invention

The present inventive concept relates to a method to control an audio visual (AV) device which reproduces a multimedia file and an AV device using the same.

2. Description of the Related Art

Recently, a great number of users are using various audio visual (AV) devices. For example, users are carrying MP3 players, personal multimedia players (PMPs), and mobile phones. Among the AV devices, the MP3 player provides a music play function, a recording function, a radio function, and a wake-up call function. However, those functions are substantially similar. That is, those functions do not vary depending on the user's liking or lifestyle. To perform a wake-up call at his/her intended time, a user needs to personally set the time in the device. Likewise, a user needs to personally download his/her intended music songs one by one and needs to personally set a recording menu to record a lecture.

Most AV devices are getting smaller to enhance portability. Hence, users feel very uncomfortable in setting those functions one by one. To record a lecture, the user is liable to forget to press the record button while preparing for the lecture to begin. In this situation, a recording is commenced after the lecture begins.

SUMMARY OF THE INVENTION

The present general inventive concept provides an AV device which receives personal information of a user and automatically operates the AV device according to the personal information without receiving any further input from the user. Accordingly, an AV device can be customized to perform a wake-up call, to execute a recording or a music play function, and to download and play a user's favorite music by itself, according to the user's schedule.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an AV device control method including establishing an interface between an AV device and an external device, automatically receiving personal information of a user from the external device, and automatically controlling the AV device in accordance with the received personal information.

The personal information may be stored in a system setup file which is automatically executed when the AV device is booted up.

The system setup file may be stored in a user non-accessible area of a memory of the AV device.

The controlling operation may control the AV device to automatically select and execute an AV file based on the personal information without a user input.

The personal information may include at least one of information input from the user and information received from a network.

The information input from the user may be schedule information of the user. The operation may execute one of an AV file play function, a wake-up call function, and a record data function according to the schedule.

The information received from the network may be biorhythm information or stress information of the user.

The AV device control method may further include collecting, at the external device, general information received from a network and combining the received general information with the personal information to control the AV device.

The foregoing and/or other aspects and utilities of the present general inventive concept may also be achieved by providing an AV device including an interface to communicatively connect to an external device, and a controller to receive user information from the external device connected through the interface and to automatically control the AV device according to the received information without a user command being input.

The controller of the AV device may store the received user personal information as a system setup file which is automatically executed when the AV device is booted up.

The system setup file may be stored in a user non-accessible area of a memory of the AV device.

The controller may control the AV device to automatically select and to execute an AV file based on the received personal information without a user input command.

The received personal information may include at least one of information input from a user and information received from a network.

The information input from a user may be schedule information of the user, and the controller may execute one of an AV file play function, a wake-up call function, and a record data function according to the schedule.

The information received over the network may be biorhythm or stress information of the user.

The controller may collect at the external device, general information from a network and may combine the general information with the received user personal information.

The foregoing and/or other aspects and utilities of the present general inventive concept may also be achieved by providing a terminal device control method including collecting personal information of a user, establishing an interface between the terminal device and an AV device and, automatically transmitting the user personal information to the AV device to automatically control the AV device according to the transmitted personal information without the AV device receiving a user command.

The foregoing and/or other aspects and utilities of the present general inventive concept may also be achieved by providing a terminal device including an interface to communicatively connect to an external device, and a controller to receive personal information of a user and to automatically transmit the personal information to the AV device via the interface to automatically control the AV device according to the received personal information without a user command input.

The user personal information may be input by a user at the external device and transmitted to the AV device via a wireless connection.

The user personal information may be input by a user at the external device and transmitted to the AV device via a USB connection.

The AV device may be automatically controlled to play music according to the user personal information.

The AV device may be automatically controlled to retrieve a music data file from the external device according to the user personal information.

The foregoing and/or other aspects and utilities of the present general inventive concept may also be achieved by providing a computer readable medium containing a method to control an AV device, including receiving user personal information by an AV device input by a user, controlling the AV device to perform an automatic function according to the received user personal information, and automatically transferring a data file to the AV device from an external device according to the received user personal information.

The foregoing and/or other aspects and utilities of the present general inventive concept may also be achieved by providing an audio/visual (AV) interface system, including an AV device having a controller to execute at least one of an AV file play function, a wake-up call function, and a record data function according to user personal information received from an external source, and an internet accessible computing device connected to the AV device and having user personal information stored therein to transmit to the AV device.

The AV device may be connected to the personal computing device via a wireless connection.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1:
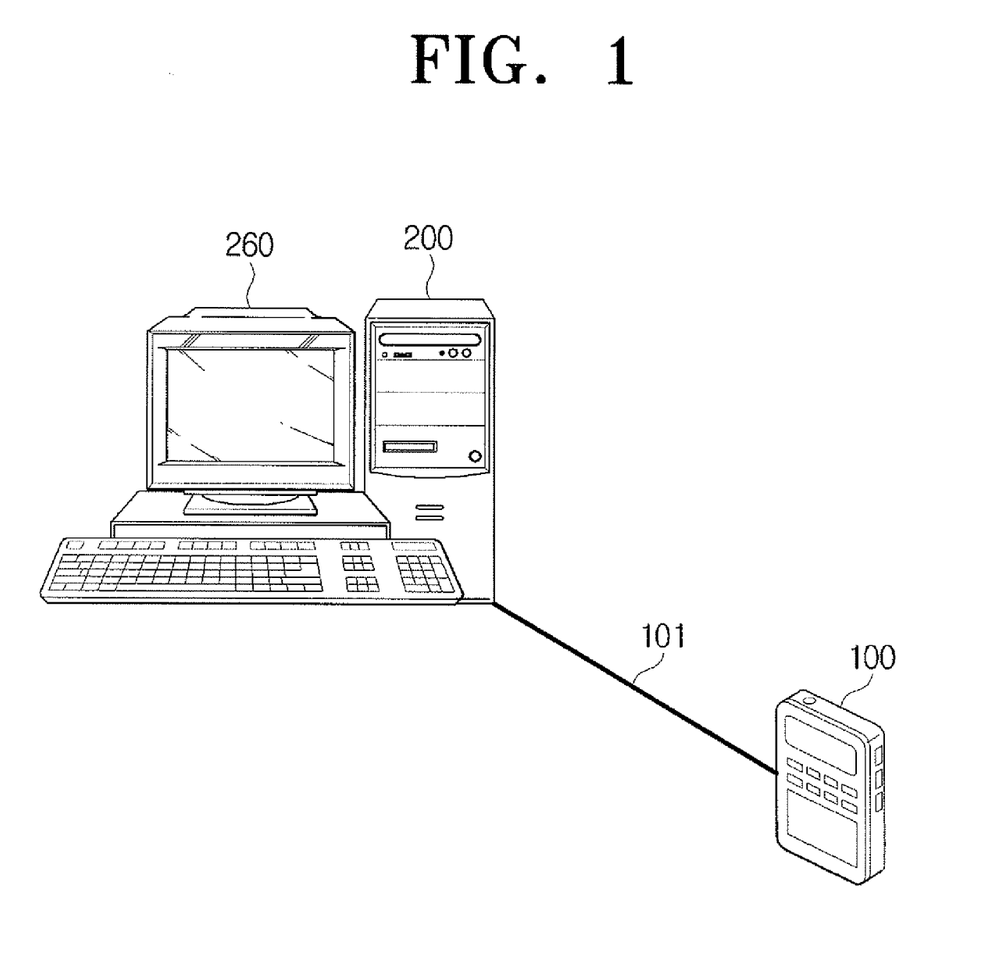
FIG. 1 is a diagram illustrating a connection between a MP3 player and a PC according to an embodiment of the present inventive concept.

FIG. 1 depicts a connection between an MP3 player and a PC according to an embodiment of the present inventive concept. An audio visual (AV) device 100, such as an MP3 player, an external device 200 such as a PC, and a display 260 are illustrated. The display 260 may be a cathode ray tube (CRT) display, a light emitting diode (LED) display, a liquid crystal display (LCD), or any other visual type display.

A user may connect the MP3 player 100 to the PC 200 via connection 101 to charge a battery (not illustrated) of the MP3 player 100 and/or to download a music file. In one embodiment, the MP3 player 100 is connected using a connection 101 which may be a Universal Serial Bus (USB) connection. The connection 101 may be a wireless connection for file transfer. The MP3 player 100 connected to the PC may be displayed in the display 260 as a removable device, such as a removable disk. A user can easily transmit and receive files between the PC 200 and the MP3 player 100 using a file browser application to search for, and to transfer, files of the MP3 player configured on the PC 200 as a removable disk.

Figure 2:
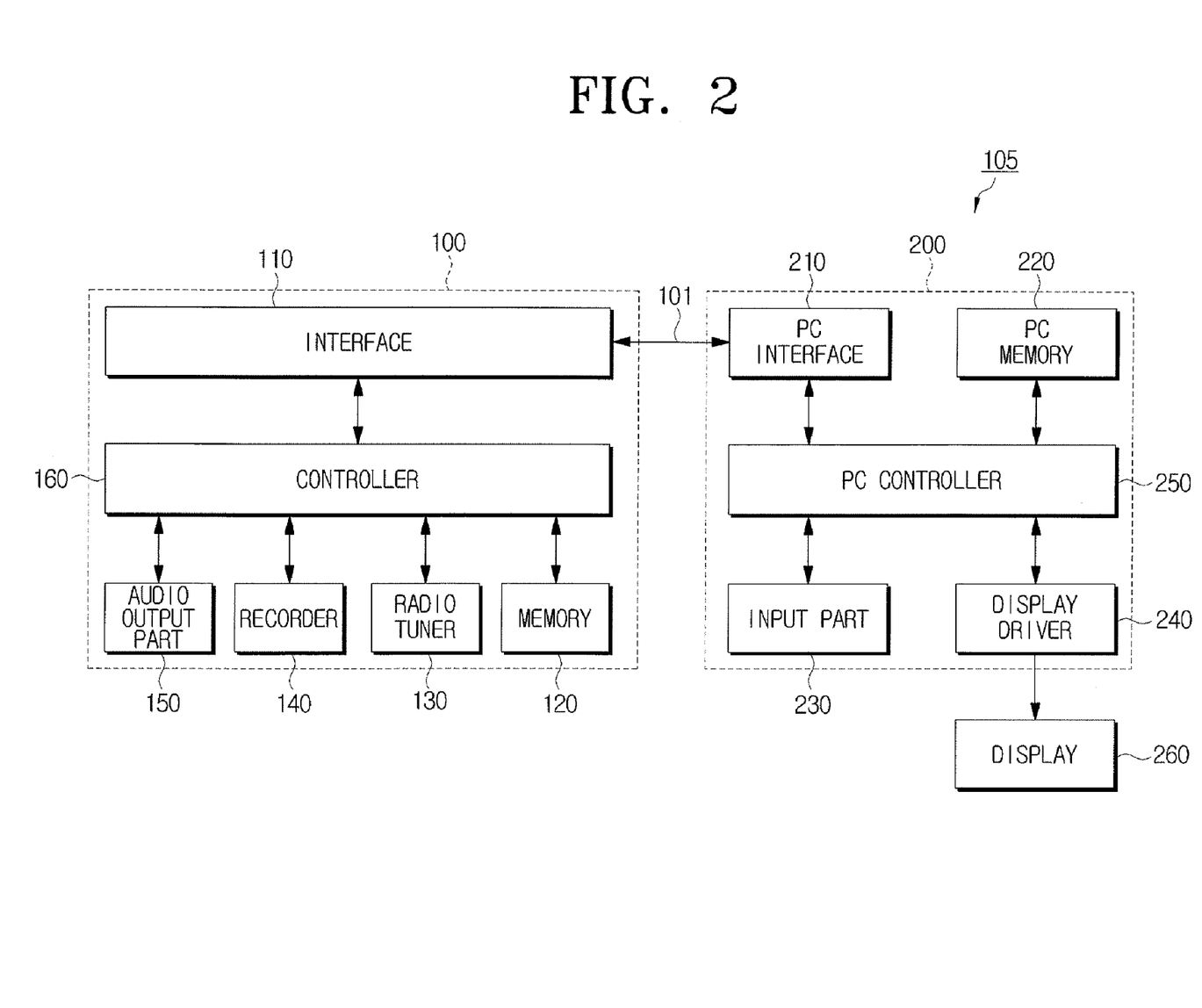
FIG. 2 is a block diagram illustrating a system to interface between the MP3 player and the PC according to an embodiment of the present inventive concept.

FIG. 2 is a block diagram of an interface system 105 to interface between the MP3 player 100 and the PC 200 according to an embodiment of the present inventive concept. Functional blocks of the MP3 player 100, the PC 200, and the display 260 are illustrated in FIG. 2.

The MP3 player 100 of FIG. 2 includes an interface 110, a memory 120, a radio tuner 130, a recorder 140, an audio output part 150, and a controller 160.

The MP3 player interface 110 is connected via the connection 101 to a PC interface 210 of the PC 200, to transmit and receive data files.

The memory 120 contains data files such as audio files and video files to use with the MP3 player 100, and various system files to be used to control and operate functions of the MP3 player 100. Particularly, the system files include executable files to directly operate the MP3 player 100, and setup files. System files are typically stored in areas of the memory 120 that are hidden from, and not accessible to, a user.

The radio tuner 130 may provide a radio broadcasting function by outputting a broadcast signal received from a broadcast station, which may be AM or FM, by cable or by radio through an internal speaker (not illustrated), or through a removable user listening device (not illustrated) such as earbuds, an earphone, or headphones. The received broadcast signal may also be stored in the memory 120 as an audio file after being processed by the controller 160. One such process may be an analog-to-digital (A/D) conversion process.

The recorder 140 may record external voice information through a microphone and store the recorded information as an audio file to the memory 120.

The audio output part 150 produces the music through a speaker or a removable listening device by executing an audio file stored in the memory 120 according to a user's manipulation of the MP3 player, such as by a user entering a "Play", "Fast Forward", "Play Next File", or other command.

The controller 160 controls overall operation of the MP3 player 100. Particularly, the controller 160 controls the MP3 player 100 according to personal information of a user, which will be described in detail below by referring to FIGS. 3 through 6.

The PC 200 in FIG. 2 includes the PC interface 210, a PC memory 220, an input part 230, a display driver 240, and a PC controller 250.

The PC interface 210 is connected via the connection 101 to the interface 110 of the MP3 player 100 to transmit and receive data files.

The PC memory 220 contains data files and system files. The input part 230 receives user's commands via a user interface (not illustrated) such as a keyboard, a touchscreen, function/command buttons, or a mouse.

The display driver 240 generates a graphic display, such as a graphic user interface (GUI), and provides the generated graphic display to the display 260. The display 260 outputs the graphic display input from the display driver 240.

The PC controller 250 controls overall operation of the PC 200. According to an embodiment of the present inventive concept, the PC controller 250 controls gathering of personal information of the user, which is described below in detail by referring to FIGS. 3, 4 and 5.

Figure 3:
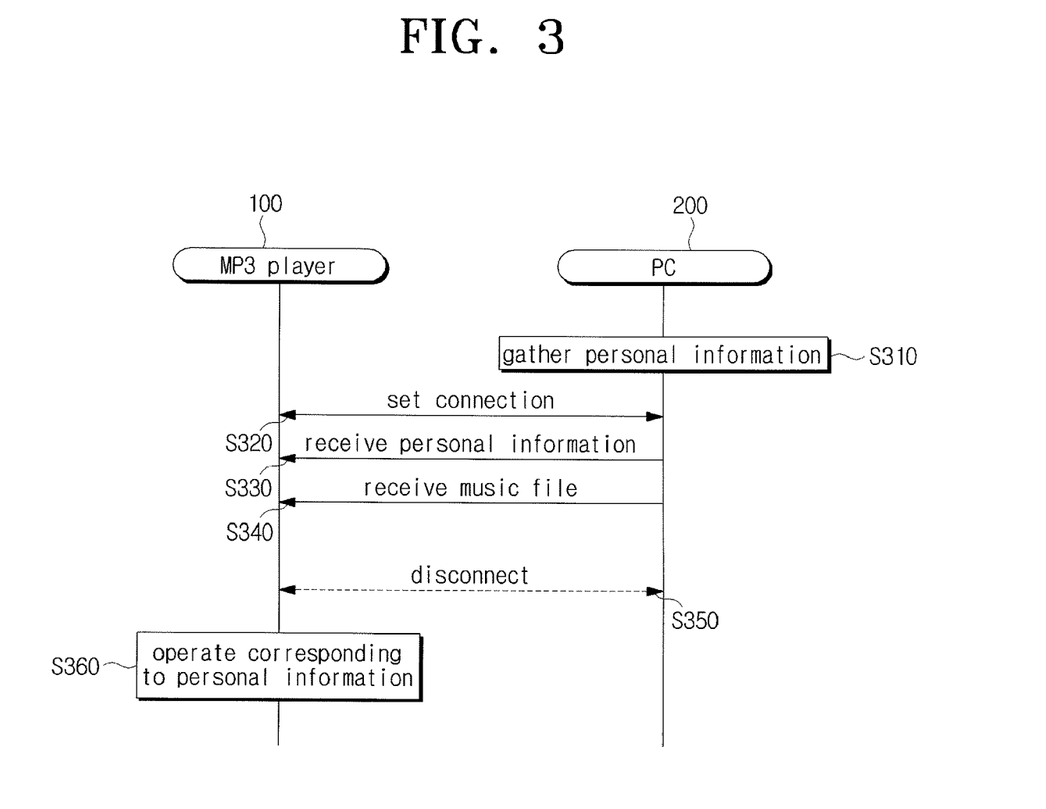
FIG. 3 is a flowchart illustrating a connection and data flow between the MP3 player and the PC according to an embodiment of the present inventive concept.

FIG. 3 is a flowchart of a connection and data flow between the MP3 player 100 and the PC 200 according to an embodiment of the present inventive concept.

The PC controller 250 collects personal information of a user through the input part 230 (operation S310).

Figure 4:
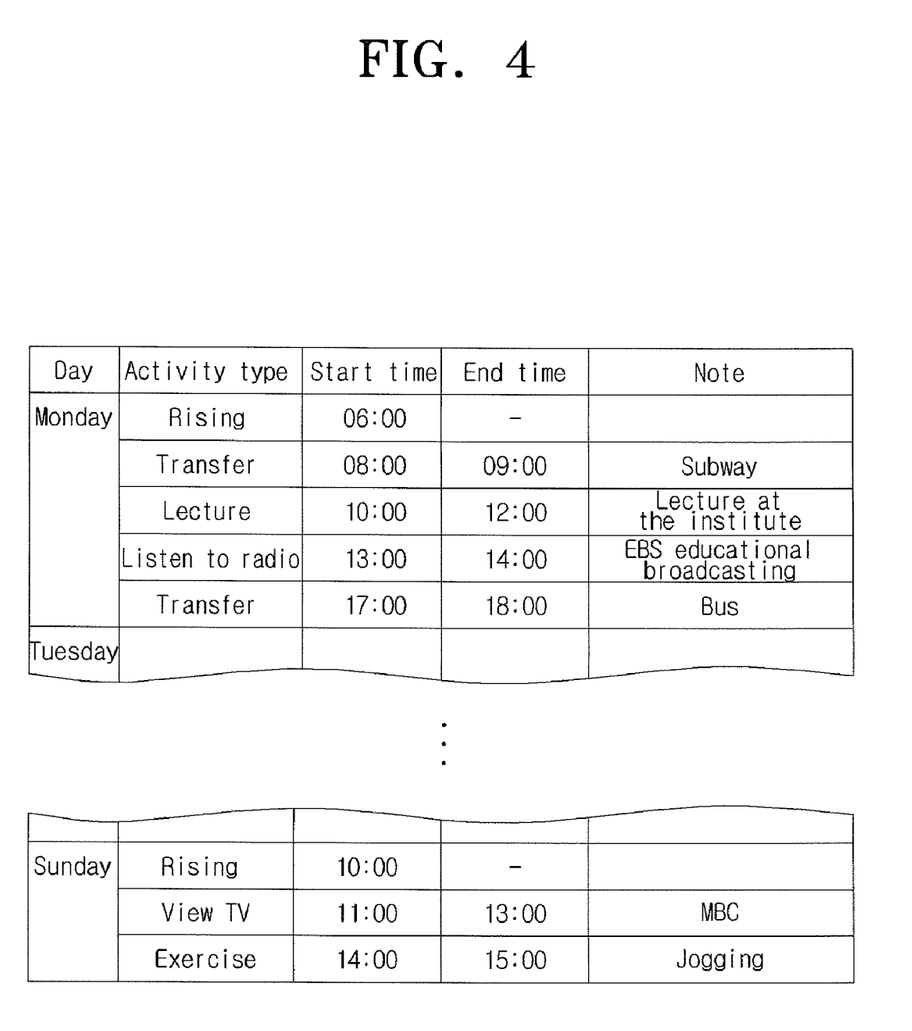
FIG. 4 is a diagram illustrating an example of a schedule which is one of personal information according to an embodiment of the present inventive concept.

FIG. 4 illustrates an activity schedule table which is one example of a type of personal information that a user may input, according to an embodiment of the present inventive concept. The user can input his/her daily time schedule as illustrated in FIG. 4 using the input part 230.

Referring back to FIG. 3, the PC controller 250 stores the personal itinerary schedule table example of FIG. 4, and may also store a user's biorhythm information collected from a network such as the Internet or from another source, to the PC memory 220 as a data file, such as an autosys.set file, in a specific directory in the PC memory 220.

Next, when the MP3 player 100 is connected to the PC 200 via the connection 101, which may be a USB connection (operation S320), the controller 160 of the MP3 player 100 receives the personal information stored in the PC 200 through the interface 110 via the connection 101 (operation S330). The personal information can also be received manually by the user. Preferably, the system automatically receives the personal information upon the detection of the connection 101 for the sake of user convenience. Specifically, the autosys.set file stored in the PC memory 220 in operation S310 can be copied to the memory 120 of the MP3 player 100 via the connection 101. In such a case, the autosys.set file is stored in a hidden area of the memory 120 to prevent the user from having access to the file to delete or edit the file at will.

In addition to the personal information, the MP3 player 100 can receive a data file such as an audio file (operation S340) via the connection 101. The MP3 player 100 itself can automatically download music files from among music files stored in the PC memory 220 of the PC 200 by taking into account the user personal information, which may include information such as a user's preferred music genre, musical group, or personal itinerary schedule as illustrated in FIG. 4.

For example, when the connection 101 is established and one or more music files of a user's favorite music genre are stored in the PC memory 220 and one or more of these files are not contained in the memory 120 of the user's MP3 player 100, such one or more files can be downloaded through the interface 110 immediately and automatically under the control of the controller 160 of the MP3 player or the control of the PC controller 250. Alternatively, by the controller 160 sending a control signal to the PC controller 250 via the connection 101, one or more files of a user's genre not included in the memory 120 of the MP3 player can be automatically, or manually, downloaded through the PC controller 250 from an Internet connection or other network connection of the PC 200, and then downloaded to the MP3 player 100 via the connection 101.

When the MP3 player 100 is disconnected from the PC 200 (operation S350), the controller 160 of the MP3 player 100 controls the operation of the MP3 player 100 according to the personal information (operation S360).

Figure 5:
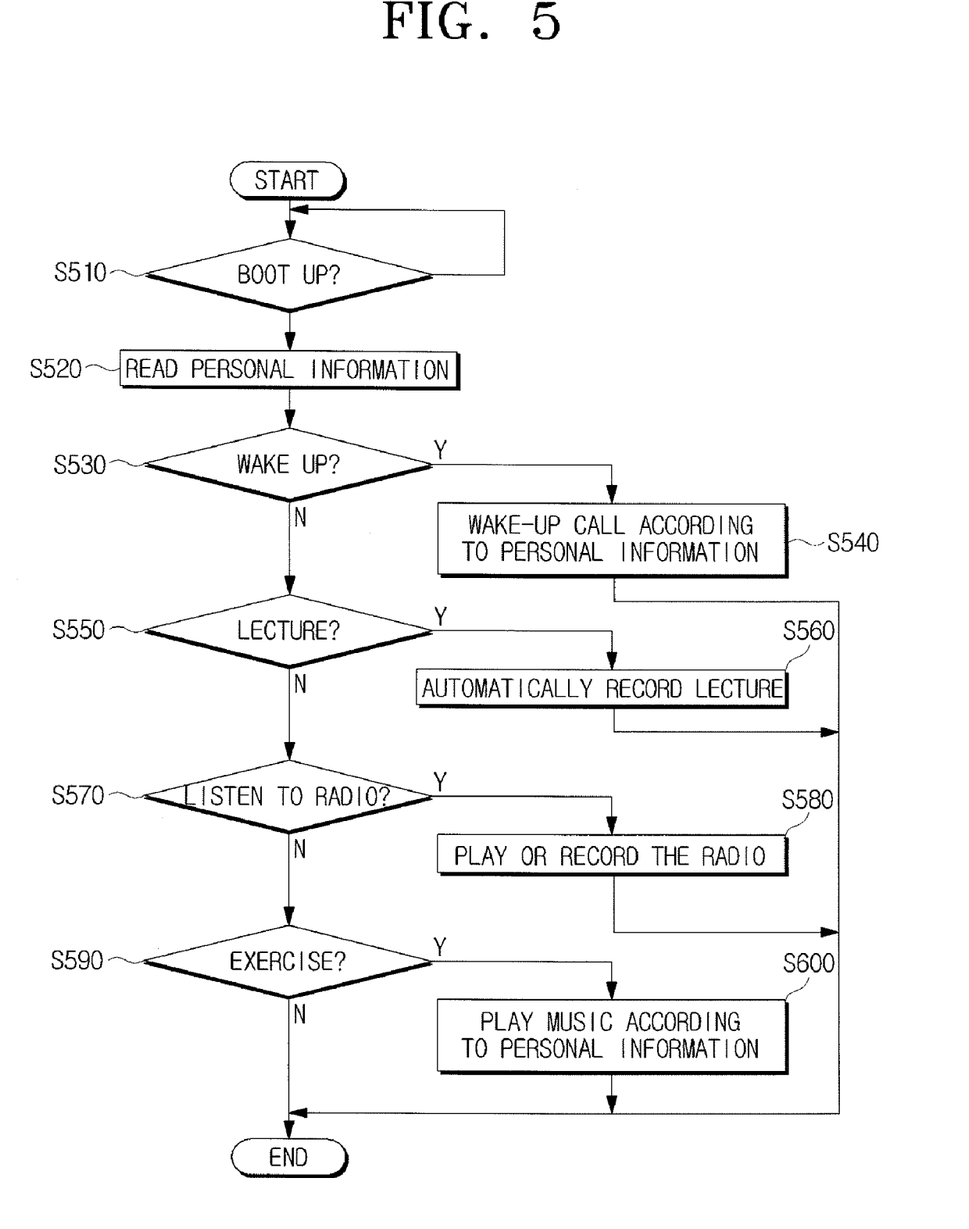
FIG. 5 is a flowchart illustrating a control method of an MP3 player according to an embodiment of the present inventive concept.

The control of the MP3 player 100 by the controller 160 according to the personal information is explained below in further detail by referring to FIG. 5.

When the MP3 player 100 is booted up (operation S510), the controller 160 reads the autosys.set file stored in the hidden area of the memory 120 (operation S520).

The personal information read from the autosys.set file includes, in this example, an itinerary schedule and favorite music information input by a user, and may include biorhythm information collected from a network or from another source. For this embodiment of the present inventive concept, refer to the personal itinerary schedule of FIG. 4.

An example of controlling the MP3 player 100 based on the itinerary schedule is now described in more detail. As illustrated in FIG. 4, 6:00 AM on Monday corresponds to a user's rising time. A wake-up call may occur at operation S530. The controller 160 controls the audio output part 150 to perform a wake-up call, even without a any further input by the user (operation S540).

In performing a wake-up call, the controller 160 can automatically select wake-up call music by taking into account the user's personal information. Such a selection may vary. For example, the controller 160 can select to play from the user's favorite genre, a gentle song to awake the user peacefully when a physical cycle of the user's biorhythm is optimal, or may select to play relatively loud music when the physical cycle is not so optimal.

Referring to FIG. 4, 10:00 AM on Monday is the user's lecture according to the itinerary schedule (operation S550). The controller 160 controls the recorder 140 to record the lecture beginning at 10:00 AM even when no further input from the user is received (operation S560). That is, the user attends the lecture as scheduled and the record file of the lecture is automatically recorded and stored to the MP3 player 100 beginning at 10:00 AM. Thus, while the user concentrates on the lecture, the entire lecture is recorded without any portion of the lecture after 10:00 AM being omitted. Even if the MP3 player 100 is turned off, it is automatically powered on to commence the lecture recording at 10:00 AM.

Afterwards, when the MP3 player 100 is connected via the connection 101 to the PC 200 through the interface 110, the recorded file is automatically or manually copied to the PC memory 220 of the PC 200 for later review by the user.

Referring to FIG. 4, 13:00, or 1:00 PM, on Monday is the time for the user to listen to the radio as scheduled (operation S570). The controller 140 controls the recorder 140 to record the radio or controls the radio tuner 130 to turn the radio (operation S580) to a preset radio frequency even when there is no further user input.

At 14:00, or 2:00 PM, on Sunday is the time for the user to exercise as scheduled (operation S590). Even when no further user input is received, the controller 160 controls the audio output part 150 to automatically reproduce rhythmical music for the one-hour exercise session (operation S600).

A method to automatically control the MP3 player 100 without a user's additional input has been described and illustrated.

The MP3 player may be connected to the PC by a cable such as a USB cable, and/or the MP3 player can be connected by a wireless connection such as Bluetooth and Wi-Fi.

The AV device is described by way of example as an MP3 player, however the present inventive concept is applicable to any portable or non-portable AV device. Specifically, the AV device in another embodiment may be a TV, a mobile phone, a personal multimedia player (PMP), or a personal digital assistant (PDA) having the functional blocks illustrated in FIG. 2.

The external device connected to the MP3 player is in one embodiment the PC, however in another embodiment the present inventive concept is applicable to any terminal device enabling the user to easily input his/her personal information. For example, the terminal device can be a PDA.

A user's personal information is utilized in one embodiment, however in another embodiment the music can be selected according to general information such as weather forecast. For example, when it will be rainy according to a weather forecast, the MP3 player may play the radio news instead of music so that the user can take an umbrella and be prepared for the weather in advance.

In one embodiment the autosys.set file is generated at the PC, however in another embodiment the MP3 player can generate the autosys.set file.

As set forth above, in one embodiment the AV device automatically operates according to a user's personal information. Accordingly, a user can have an AV device customized to perform a wake-up call, to record and play music, and to download and play music suitable for the user's liking based on the user's itinerary schedule.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. An audio visual (AV) device control method, comprising:
    establishing an interface between an AV device and an external device;
    automatically receiving personal information of a user from the external device, the personal information including a schedule input from the user, the schedule including at least one event having a predetermined type, the at least one event not associated with an AV function of the AV device when the personal information is received from the external device;
    detecting with the AV device the type of the at least one event and a predetermined time at which the at least one event is scheduled to begin;
    with the AV device, automatically associating an AV function of the AV device with the detected event type from the schedule, the AV function including one of an AV file play function, a wake-up call function, and a record data function according to the detected event type; and
    automatically performing the AV function of the AV device at the predetermined time.

2. The AV device control method of claim 1, wherein the personal information is stored in a system setup file which is automatically executed when the AV device is booted up.

3. The AV device control method of claim 2, wherein the system setup file is stored in a user non-accessible area of a memory of the AV device.

4. The AV device control method of claim 1, wherein the control operation controls the AV device to automatically select and execute an AV file based on the personal information without a user input.

5. The AV device control method of claim 1, wherein the personal information includes information received from a network.

6. The AV device control method of claim 5, wherein the information received from the network is biorhythm information or stress information of the user.

7. The AV device control method of claim 1, further comprising:
    collecting at the external device general information received from a network and combining the received general information with the personal information to determine the function of the AV device to associate with the detected event type.

8. An AV device, comprising:
    an interface to communicatively connect to an external device; and
    a controller to receive user personal information from the external device connected through the interface, the user personal information including a schedule input from a user, the schedule including at least one event having a predetermined type, and a predetermined start time, and not having an associated AV function when the personal information is received by the controller, the controller configured to detect the type of the at least one event, to automatically associate an AV function of the AV device with the detected event based on the detected event type, the AV function including one of an AV file play function, a wake-up call function, and a record data function according to the detected event type, and to automatically perform the AV function of the AV device at the predetermined start time without a user command being input,
    wherein the controller associates different AV functions of the AV device with different detected event types, and
    the at least one event of the user personal information is not associated with the AV function when the personal information is received by the controller.

9. The AV device of claim 8, wherein the controller stores the received user personal information as a system set file which is automatically executed when the AV device is booted up.

10. The AV device of claim 8, wherein the system setup file is stored in a user non-accessible area of a memory of the AV device.

11. The AV device of claim 8, wherein the controller controls the AV device to automatically select and to execute an AV file based on the received personal information without a user input command.

12. The AV device of claim 8, wherein the received personal information includes information received from a network.

13. The AV device of claim 12, wherein the information received over the network is biorhythm or stress information of the user.

14. The AV device of claim 8, wherein the controller collects at the external device general information from a network and combines the general information with the received user personal information to determine the AV function of the AV device to associate with the detected event type.

15. A terminal device control method, comprising:
collecting personal information of a user;
establishing an interface between the terminal device and an AV device;
automatically transmitting user personal information to the AV device to automatically perform an AV function of the AV device at a time determined by the transmitted personal information without the AV device receiving a user command, the personal information including a schedule input from a user, the schedule including at least one event having a predetermined type, and a predetermined start time, and not having an associated AV function when the user personal information is transmitted to the AV device,
wherein automatically performing the AV function comprises:
detecting the event type of the at least one event;
with the AV device, automatically associating the at least one event with the AV function, the AV function including one of an AV file play function, a wake-up call function, and a record data function according to the detected event type; and
automatically setting the AV device to begin the associated function at the predetermined start time.

16. A terminal device, comprising:
an interface to communicatively connect to an AV device; and
a controller to receive personal information of a user, the user personal information including a schedule input from the user, the schedule including at least one event having a predetermined type, and a predetermined start time, and not having an associated AV function when the controller receives the personal information, the controller configured to detect the type of the at least one event, to automatically associate an AV function of the AV device with the detected event based on the detected event type, and to automatically transmit the personal information to the AV device via the interface to automatically perform the AV function of the AV device at the predetermined start time without a user command input,
wherein the AV function includes one of one of an AV file play function, a wake-up call function, and a record data function according to the detected event type.

17. The terminal device of claim 16, wherein the user personal information is input by a user at the external device and is transmitted to the AV device via a wireless connection.

18. The terminal device of claim 16, wherein the user personal information is input by a user at the external device and is transmitted to the AV device via a USB connection.

19. The terminal device of claim 16, wherein the AV device is automatically controlled to play music according to the user personal information.

20. The terminal device of claim 16, wherein the AV device is automatically controlled to retrieve a music data file from the external device according to the user personal information.

21. A non-transitory computer readable medium containing a method to control an AV device, comprising:
receiving at an AV device user personal information input by a user, the personal information including a schedule input by the user and including at least one event having a predetermined type and a predetermined start time, and not having an associated AV function when the personal information is received at the AV device;
detecting with the AV device the event type of the at least one event;
with the AV device, automatically associating the at least one event with an AV function of the AV device, the AV function including one of an AV file play function, a wake-up call function, and a record data function according to the detected event type;
controlling the AV device to perform the AV function at the predetermined start time; and
automatically transferring a data file to the AV device from an external device according to the received user personal information,
wherein different AV functions of the of the AV device are respectively associated with different event types of the plurality of event types.

22. An audio/visual (AV) interface system, comprising:
an AV device having a controller to execute at least one of an AV file play function, a wake-up call function, and a record data function to record at least one of audio and video at a time determined by user personal information received from an external source, the personal information including a schedule input by a user and including at least one event having a predetermined type and a predetermined start time, and not having an associated AV function when the personal information is received from the external source; and
an internet accessible computing device connected to the AV device and having user personal information stored therein to transmit to the AV device,
wherein the controller of the AV device detects the event type of the at least one event and automatically associates the at least one event with an AV function of the AV device, the AV function including one of one of an AV file play function, a wake-up call function, and a record data function according to the detected event type, the controller associates the respective AV functions of the AV device with different event types and sets the AV device to perform the associated function at the predetermined start time, and
at least one event is at least one user schedule included in the personal information.

23. The AV interface system of claim 22, wherein the AV device is connected to the personal computing device via a wireless connection.

* * * * *